(12) United States Patent
Kadoi

(10) Patent No.: US 8,451,215 B2
(45) Date of Patent: May 28, 2013

(54) DISPLAY CONTROL DEVICE, PROGRAM FOR IMPLEMENTING THE DISPLAY CONTROL DEVICE, AND RECORDING MEDIUM CONTAINING THE PROGRAM

(75) Inventor: Kazunori Kadoi, Osaka (JP)

(73) Assignee: Capsom Co., Ltd., Osaka (JP)

( * ) Notice: Subject to any disclaimer, the term of this patent is extended or adjusted under 35 U.S.C. 154(b) by 992 days.

(21) Appl. No.: 12/522,610

(22) PCT Filed: Dec. 19, 2007

(86) PCT No.: PCT/JP2007/074430
§ 371 (c)(1),
(2), (4) Date: Jul. 9, 2009

(87) PCT Pub. No.: WO2008/099564
PCT Pub. Date: Aug. 21, 2008

(65) Prior Publication Data
US 2010/0039383 A1    Feb. 18, 2010

(30) Foreign Application Priority Data

Jan. 12, 2007 (JP) .................................. 2007-004359

(51) Int. Cl.
*G09G 5/00* (2006.01)
(52) U.S. Cl.
USPC .................. 345/156; 345/169; 348/14.05
(58) Field of Classification Search
USPC .................. 345/156–160, 179–181
See application file for complete search history.

(56) References Cited

U.S. PATENT DOCUMENTS

| | | | |
|---|---|---|---|
| 5,973,689 A * | 10/1999 | Gallery | 715/859 |
| 6,110,039 A | 8/2000 | Oh | |
| 6,225,979 B1 * | 5/2001 | Taima et al. | 345/157 |
| 6,346,933 B1 * | 2/2002 | Lin | 345/157 |
| 7,852,317 B2 * | 12/2010 | Grunnet-Jepsen et al. | 345/158 |
| 8,068,094 B2 * | 11/2011 | Sakurai et al. | 345/157 |
| 2001/0010514 A1 | 8/2001 | Ishino | |
| 2006/0258465 A1 | 11/2006 | Lin et al. | |

FOREIGN PATENT DOCUMENTS

| | | |
|---|---|---|
| EP | 0 571 702 | 12/1993 |
| JP | 62-156718 | 7/1987 |
| JP | 5-19957 | 1/1993 |
| JP | 5-324181 | 12/1993 |
| JP | 7-175583 | 7/1995 |
| JP | 8-115197 | 5/1996 |
| JP | 8-226793 | 9/1996 |
| JP | 11-305935 | 5/1999 |
| JP | 2001-325069 | 11/2001 |
| JP | 2005-292178 | 10/2005 |
| JP | 2005-293089 | 10/2005 |
| JP | 2006-314777 | 11/2006 |

* cited by examiner

*Primary Examiner* — Duc Dinh
(74) *Attorney, Agent, or Firm* — Hamre, Schumann, Mueller & Larson, P.C.

(57) ABSTRACT

A virtual plane including a display screen is divided into small regions. If calculated coordinates of an intersection is located in one of the small regions outside the display screen, an icon corresponding to the small region is displayed at a predetermined position. If coordinates of the intersection are not calculated, an icon corresponding to the small region in which the preceding intersection coordinates were located in is displayed at a predetermined position.

20 Claims, 12 Drawing Sheets

FIG.3

| Region | Range of Coordinates | |
|---|---|---|
| 1 | $X < -Xa$ | $Y < -Ya$ |
| 2 | $-Xa \leq X \leq Xa$ | $Y < -Ya$ |
| 3 | $Xa < X$ | $Y < -Ya$ |
| 4 | $X < -Xa$ | $-Ya \leq Y \leq Ya$ |
| 5 | $Xa < X$ | $-Ya \leq Y \leq Ya$ |
| 6 | $X < -Xa$ | $Ya < Y$ |
| 7 | $-Xa \leq X \leq Xa$ | $Ya < Y$ |
| 8 | $Xa < X$ | $Ya < Y$ |

FIG.4

| Region | Icon | Direction | Icon Coordinates |
|---|---|---|---|
| 1 | 1' | 135° | X1、Y1 |
| 2 | 2' | 180° | X2、Y2 |
| 3 | 3' | 225° | X3、Y3 |
| 4 | 4' | 90° | X4、Y4 |
| 5 | 5' | 270° | X5、Y5 |
| 6 | 6' | 45° | X6、Y6 |
| 7 | 7' | 0° | X7、Y7 |
| 8 | 8' | 315° | X8、Y8 |

| Region | Range of Coordinates | |
|---|---|---|
| 1' | $-Xa \leq X < -Xb$ | $-Ya \leq Y < -Yb$ |
| 2' | $-Xb \leq X \leq Xb$ | $-Ya \leq Y \leq 0$ |
| 3' | $Xb < X \leq Xa$ | $-Ya \leq Y < -Yb$ |
| 4' | $-Xa \leq X < -Xb$ | $-Yb \leq Y \leq Yb$ |
| 5' | $Xb < X \leq Xa$ | $-Yb \leq Y \leq Yb$ |
| 6' | $-Xa \leq X < -Xb$ | $Yb < Y \leq Ya$ |
| 7' | $-Xb \leq X \leq Xb$ | $0 < Y \leq Ya$ |
| 8' | $Xb < X \leq Xa$ | $Yb < Y \leq Ya$ |

DISPLAY CONTROL DEVICE, PROGRAM FOR IMPLEMENTING THE DISPLAY CONTROL DEVICE, AND RECORDING MEDIUM CONTAINING THE PROGRAM

TECHNICAL FIELD

The present invention relates to a controlling device for displaying a cursor on a display screen, and specifically to a display controlling device for notifying that the cursor is out of the display screen when the cursor is not positioned inside the display screen, a program for implementing such a display controlling device, and a recording medium storing such a program.

BACKGROUND ART

Conventionally, in video game machines or computers, an icon or a position on the display screen is pointed by moving a cursor on the screen with direction keys, a mouse or the like (hereinafter, referred to as "conventional cursor moving means"). The cursor is moved as follows: The direction and the amount of movement of the cursor are input through the conventional cursor moving means and detected every predetermined period. The cursor display position is moved to a location which is obtained by adding the amount of movement regarding the direction of the movement to the current cursor display position.

FIG. 14 illustrates a method of moving the cursor with a mouse. By movement of a mouse from a position 802 to a position 802', a cursor 801 moves. If it is supposed that the amount ($\Delta X$, $\Delta Y$) of the movement of the cursor is input through the mouse 802, the display position (X, Y) of the cursor 801 moves to a display position ($X+\Delta X$, $Y+\Delta Y$).

Another cursor moving method developed recently uses a pointing device to point a position on the display screen directly. The pointing device captures the image of the display screen with an imaging sensor, such as a CCD camera, mounted to the tip thereof, and outputs information about where in the image captured by the imaging sensor the certain light from the light emitting body mounted above or around the display screen is positioned. In this cursor moving method, the cursor is moved as follows: The intersection of the optical axis extending from the central point of the imaging sensor to the display screen in the direction of the normal line and the display screen is calculated from the information output from the pointing device. The cursor is displayed at the position of the intersection. In this way, the cursor is moved to follow changes of the direction pointed by the pointing device.

FIG. 15 illustrates the method of moving the cursor by using the pointing device. By change of the direction from that pointed by the pointing device 803 to that pointed by the pointing device 803', the cursor 801 on a display screen 800 moves from a display position (X, Y) to a display position (X', Y').

A method of calculating the cursor display position (the intersection of the optical axis of the imaging sensor and the display screen) with a pointing device is disclosed in JP-A-8-226793, for example. In this method, infrared spots are displayed at the left and right edges of the display screen. A CCD camera provided at a tip of an imitated gun captures an image. The position shot by the imitated gun on the display screen is detected based on the position of the infrared spots in the captured image.

Patent Document 1: JP-A-8-226793

DISCLOSURE OF THE INVENTION

Problems to be Solved by the Invention

However, in the cursor moving method using the pointing device, coordinates of the cursor display position is determined and then the cursor is displayed at the coordinates. Therefore, if the coordinates of the display position is out of the display screen, the cursor is not displayed on the display screen because the cursor is treated as being located out of the display screen.

For example, if the direction indicated by the pointing device 803 is changed to a direction indicated by a pointing device 803" as shown in FIG. 15, the cursor is not displayed on the display screen because the cursor is treated as being at a display position (X", Y"). In this case, the user does not understand why the cursor is not displayed and what makes the cursor displayed, and is perplexed. Such a situation is disadvantageous in particular if the user is required to make a quick selection during playing the game.

In the method using conventional cursor moving means, relative amount regarding the current cursor display is input through the conventional cursor moving means, and the cursor is moved by this amount. Therefore, if the movement of the cursor is limited within the display screen, the cursor does not move out of the display screen. Accordingly, it is critical to the user accustomed to the conventional cursor moving means that the cursor is not displayed on the display screen.

The present invention has been proposed under the above-described circumstances, and it is an object of the present invention to provide a display controlling device for notifying that the cursor is moved out of the display screen or for notifying the direction in which the cursor is moved out from the display screen when the cursor is not displayed on the display screen.

Means for Solving the Problems

According to the first aspect of the present invention, there is provided a display controlling device comprising: a display unit for displaying an image; an input unit at which a signal is input, the signal being output from an operation unit, the operation unit including an imaging sensor for capturing a light image, the signal being based on an image captured by the imaging sensor, the operation unit being arranged for a user to hold and operate, the light image being emitted from a light emitter toward front of a display screen of the display unit, the light emitter being provided in a periphery of the display screen; an intersection position acquirer for acquiring, every predetermined period, information about a position of an intersection based on the signal input at the input unit, the intersection being produced by a plane including the display screen of the display unit and one of a region including an optical axis of the imaging sensor and a region including an axis substantially parallel to the optical axis; a determiner for determining, every predetermined period, whether the intersection is located inside the display screen of the display unit based on the information about the position of the intersection acquired by the intersection position acquirer; a cursor displayer for displaying a cursor at the position of the intersection on the display screen of the display unit if the determiner determines that the intersection is located inside the display screen; and a first notification controller for notifying that the cursor is located outside the display screen with a first notifier if the determiner determines that the intersection is not located inside the display screen.

Preferably, the intersection position acquirer has an orthogonal coordinate system defined in a virtual plane including the display screen, and acquires coordinates of the intersection in the orthogonal coordinate system as information about the position of the intersection. The determiner determines whether the intersection is located inside the display screen of the display unit using the coordinates of the intersection acquired by the intersection position acquirer.

Preferably, the intersection position acquirer can acquire the coordinates of the intersection in a prescribed region outside the display screen in the virtual plane. The determiner acquires the position of the intersection outside the display screen using the coordinates of the intersection acquired by the intersection position acquirer if the determiner determines that the intersection is located outside the display screen of the display unit. The first notification controller notifies the position of the intersection outside the display screen acquired by the determiner with the first notifier.

Preferably, the display controlling device further comprises a storage unit for storing information about the position of the intersection acquired by the intersection position acquirer. The determiner presumes the position of the intersection outside the display screen based on the coordinates of the preceding intersection acquired by the intersection position acquirer if the determiner determines that the intersection is located outside the display screen of the display unit and if the intersection position acquirer has not been able to acquire the coordinates of the intersection, the coordinates being stored in the storage unit. The first notification controller notifies the position of the intersection outside the display screen with the first notifier, the position being presumed by the determiner.

Preferably, the virtual plane outside the display screen is divided into a plurality of small regions. The first notification controller includes: a judgment unit for judging which one of the plurality the small regions the coordinates of the intersection acquired by the intersection position acquirer are located in; and an image displayer for memorizing information indicating the position of the intersection corresponding to each of the small regions, determining information corresponding to a judgment result of the judgment unit from the information, and displaying determined information on the display screen of the display unit.

Preferably, the virtual plane outside the display screen is divided into two large regions outwardly of the screen, and the intersection position acquirer cannot acquire the coordinates of the intersection in one region outside, and the other region inside is divided into a plurality of regions, and the virtual plane inside the display screen is divided into a plurality of small regions. The intersection position acquirer acquires the coordinates of the intersection as information about the position of the intersection if the intersection is located in the other region inside, and acquires that there are no coordinates of the intersection as information about the position of the intersection if the intersection is located in the one region outside. The first notification controller includes: a storage unit for storing information about the position of the intersection acquired by the intersection position acquirer every predetermined period; a judgment unit for judging which one of the plurality of the small regions in the other regions inside the intersection is located in based on the coordinates if the information about the position of the intersection acquired by the intersection position acquirer is the coordinates of intersection, and for judging which one of the plurality of small regions in the other region inside and the plurality of small regions inside the display screen the intersection is located in based on the coordinates of the preceding intersection acquired by the intersection position acquirer and stored in the storage unit if the information about the position of the intersection is that there are no coordinates of the intersection; and an image displayer for memorizing information indicating the position of the intersection corresponding to each of the small regions, determining the information corresponding to a judgment result of the judgment unit from the information, and displaying determined information on the display screen of the display unit.

Preferably, the image displayer has a table in which icons corresponding to each of the small regions are set, and determines an icon corresponding to the judgment result of the judgment unit with reference to the table, and displays the icon at a prescribed position on the display screen of the display unit.

Preferably, display positions on the display screen of the display unit corresponding to each of the small regions are set in the table. The image displayer displays the icon at the display position corresponding to the judgment result of the judgment unit set in the table as the prescribed position.

Preferably, the small regions includes at least eight regions each located in one of up, down, right, left, right oblique and left oblique directions.

Preferably, the display controlling device further comprises a time measurer for measuring time period during which the intersection position acquirer is not able to acquire the coordinates of the intersection; and a second notification controller for notifying that the position of the cursor is unclear with a second notifier if a time period measured by the time measurer become longer than a prescribed time period.

According to the second aspect of the present invention, there is provided a program driving a computer provided with a display device to function as: an input unit at which a signal is input, the signal being output from an operation unit, the operation unit including an imaging sensor for capturing a light image, the signal being based on an image captured by the imaging sensor, the operation unit being arranged for a user to hold and operate, the light image being emitted from a light emitter toward front of a display screen of the display device, the light emitter being provided in a periphery of the display screen; an intersection position acquirer for acquiring, every predetermined period, information about a position of an intersection based on the signal input at the input unit, the intersection being produced by a plane including the display screen of the display device and one of a region including an optical axis of the imaging sensor and a region including an axis substantially parallel to the optical axis; a determiner for determining, every predetermined period, whether the intersection is located inside the display screen of the display device based on the information about the position of the intersection acquired by the intersection position acquirer; a cursor displayer for displaying a cursor at the position of the intersection on the display screen of the display device if the determiner determines that the intersection is located inside the display screen; and a first notification controller for notifying that the cursor is located outside the display screen with a first notifier if the determiner determines that the intersection is not located inside the display screen.

Preferably, the intersection position acquirer has an orthogonal coordinate system defined in a virtual plane including the display screen, and acquires coordinates of the intersection in the orthogonal coordinate system as information about the position of the intersection. The determiner determines whether the intersection is located inside the display screen of the display device using the coordinates of the intersection acquired by the intersection position acquirer.

Preferably, the intersection position acquirer can acquire the coordinates of the intersection in a prescribed region outside the display screen in the virtual plane. The determiner acquires the position of the intersection outside the display screen using the coordinates of the intersection acquired by the intersection position acquirer if the determiner determines that the intersection is located outside the display screen of the display device. The first notification controller notifies the position of the intersection outside the display screen acquired by the determiner with the first notifier.

Preferably, the program further drives the computer to function as a storage unit for storing information about the position of the intersection acquired by the intersection position acquirer. The determiner presumes the position of the intersection outside the display screen based on the coordinates of the preceding intersection acquired by the intersection position acquirer and stored in the storage unit if the determiner determines that the intersection is located outside the display screen of the display unit and if the intersection position acquirer has not been able to acquire the coordinates of the intersection. The first notification controller notifies, through the first notifier, the position of the intersection located outside the display screen and presumed by the determiner.

Preferably, the virtual plane outside the display screen is divided into a plurality of small regions. The first notification controller includes: a judgment unit for judging which one of the plurality the small regions the coordinates of the intersection acquired by the intersection position acquirer are located in; and an image displayer for memorizing information indicating the position of the intersection corresponding to each of the small regions, determining information corresponding to a judgment result of the judgment unit from the information, and displaying determined information on the display screen of the display device.

Preferably, the virtual plane outside the display screen is divided into two large regions outwardly of the screen, and the intersection position acquirer cannot acquire the coordinates of the intersection in one region outside, and the other region inside is divided into a plurality of regions, and the virtual plane inside the display screen is divided into a plurality of small regions. The intersection position acquirer acquires the coordinates of the intersection as information about the position of the intersection if the intersection is located in the other region inside, and acquires that there are no coordinates of the intersection as information about the position of the intersection if the intersection is located in the one region outside. The first notification controller includes: a storage unit for storing information about the position of the intersection acquired by the intersection position acquirer every predetermined period; a judgment unit for judging which one of the plurality of the small regions in the other regions inside the intersection is located in based on the coordinates if the information about the position of the intersection acquired by the intersection position acquirer is the coordinates of intersection, and for judging which one of the plurality of small regions in the other region inside and the plurality of small regions inside the display screen the intersection is located in based on the coordinates of the preceding intersection acquired by the intersection position acquirer and stored in the storage unit if the information about the position of the intersection is that there are no coordinates of the intersection; and an image displayer for memorizing information indicating the position of the intersection corresponding to each of the small regions, determining the information corresponding to a judgment result of the judgment unit from the information, and displaying determined information on the display screen of the display device.

Preferably, the image displayer has a table in which icons corresponding to each of the small regions are set, and determines an icon corresponding to the judgment result of the judgment unit with reference to the table, and displays the icon at a prescribed position on the display screen of the display device.

Preferably, display positions on the display screen of the display device corresponding to each of the small regions are set in the table. The image displayer displays the icon at the display position corresponding to the judgment result of the judgment unit set in the table as the prescribed position.

Preferably, the small regions includes at least eight regions each located in one of up, down, right, left, right oblique and left oblique directions.

Preferably, the program drives the computer to further function as a time measurer for measuring time period during which the intersection position acquirer is not able to acquire the coordinates of the intersection; and a second notification controller for notifying that the position of the cursor is unclear with a second notifier if a time period measured by the time measurer become longer than a prescribed time period.

According to the third aspect of the present invention, there is provided a recording medium storing the program according to the second aspect of the present invention. The recording medium is readable by a computer.

BRIEF DESCRIPTION OF THE DRAWINGS

FIG. 3 is a table which shows ranges of regions 1 through 8.

FIG. 4 is a table which shows icon direction and icon coordinates assigned for each of the regions.

BEST MODE FOR CARRYING OUT THE INVENTION

A first preferred embodiment of the present invention, in the form of a home video game machine with an operation controller functioning as a pointing device, will be described with reference to the drawings below.

Figure 1:
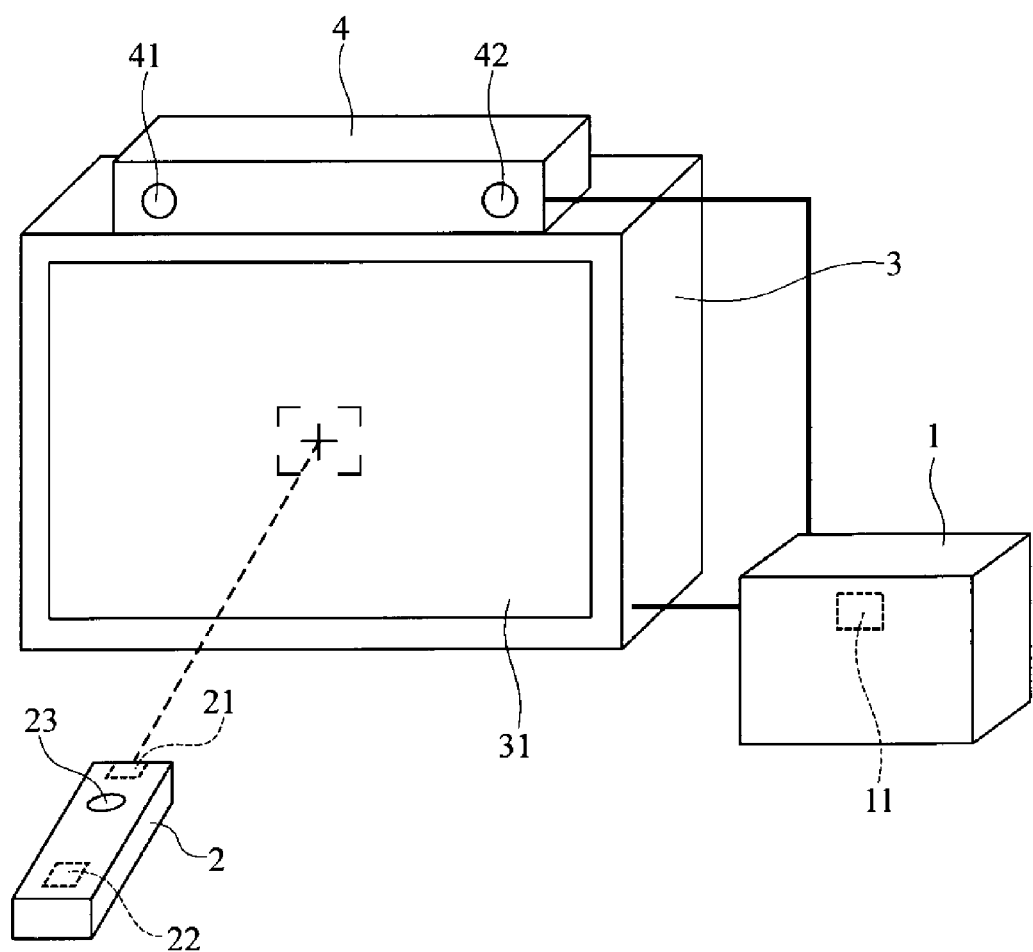
FIG. 1 shows an example of home video game machine which includes a display controlling device according to the present invention.

FIG. 1 shows an example of a home video game machine which includes a display controlling device according to the present invention. The game machine 1 is a video game machine for home use which enables the user to enjoy the game. Game programs and game data are recorded in a DVD-ROM (Digital Versatile Disc-ROM). The game programs and game data stored in the DVD-ROM dropped in the DVD-ROM drive is loaded to a memory (RAM) in the game machine 1. The game machine 1 causes the CPU (Central Processing Unit) to execute the game programs, allowing the user to enjoy the game. The game machine 1 is connected with a display device 3 having a display screen 31, such as a television set, and a light emitting device 4 which is placed on the display device 3 and provided with light emitting lamps 41, 42. An operation controller 2 performs short range wireless communications with the game machine 1 via a transmission antenna 22 and a receiving antenna 11 provided in the game machine 1.

The operation controller 2 transmits signals inputted with an operation button 23, measurement values received from various sensors which are not illustrated, and so on as information for playing the game. Also, the operation controller 2 functions as a pointing device, and transmits the information of the position of the light emitted from the light emitting device 4 in the image captured by the imaging sensor 21, such as a CCD, provided at the tip to the game machine. If the light emitting device 4 is out of capturing region of the imaging sensor 21 and hence the imaging sensor 21 is not able to capture the light emitted from the light emitting device 4, information of light capture failure is transmitted. The information obtained from the image captured by the imaging sensor 21 and transmitted from the operation controller 2 will be referred to as image capture information.

From information received from the operation controller 2 about light emitted from the light emitting device 4, the game machine 1 calculates the position of intersection ("hereinafter referred to as "intersection position") of the optical axis extending from the central point of the imaging sensor 21 of the operation controller in the normal direction and the display screen 31 of the display device. The intersection position to be calculated is different from the accurate position of the intersection of the optical axis of the imaging sensor 21 and the plane including the display screen 31 because it includes a small amount of error. However, this is not a problem in playing the game because the cursor is moved in accordance with change of the orientation of the operation controller 2, and excessive accuracy is not required. If the calculated intersection position is inside the display screen 31, the cursor is displayed at the calculated position on the display screen 31. On the other hand, if the calculated intersection position is outside the display screen 31, it is determined in which direction the cursor is moved out of the display screen based on which one of a plurality of divisional regions outside the display screen 31 the calculated position is located at. Then, an icon (hereinafter referred to as "cursor movement instruction icon") is displayed near the position where the cursor has moved out of the display screen 31 to request the user of moving the cursor back to inside the display screen 31.

If the game machine 1 is not able to calculate the intersection position due to reception of the information from the operation controller 2 that the game machine could not capture the light emitted from the light emitting device 4, the game machine 1 estimates the direction in which the cursor has moved out from the preceding position of the cursor. Specifically, the game machine 1 estimates the direction in which the cursor has moved out of the display screen based on which one of the divisional regions, inside and outside the display screen 31, the calculated preceding intersection position is located at, and then displays a cursor movement instruction icon near the position where the cursor has presumably moved out of the display screen 31. Here, for requesting the user to move the cursor back from where the cursor has moved out to inside the display screen 31, the cursor movement instruction icon has a shape for indicating the reverse direction to the direction in which the cursor has moved out. Alternatively, for notifying the user the direction in which the cursor has moved out, the icon may have a shape for indicating the direction in which cursor has moved out.

Display operation based on the calculated intersection position is described below.

Figure 2:
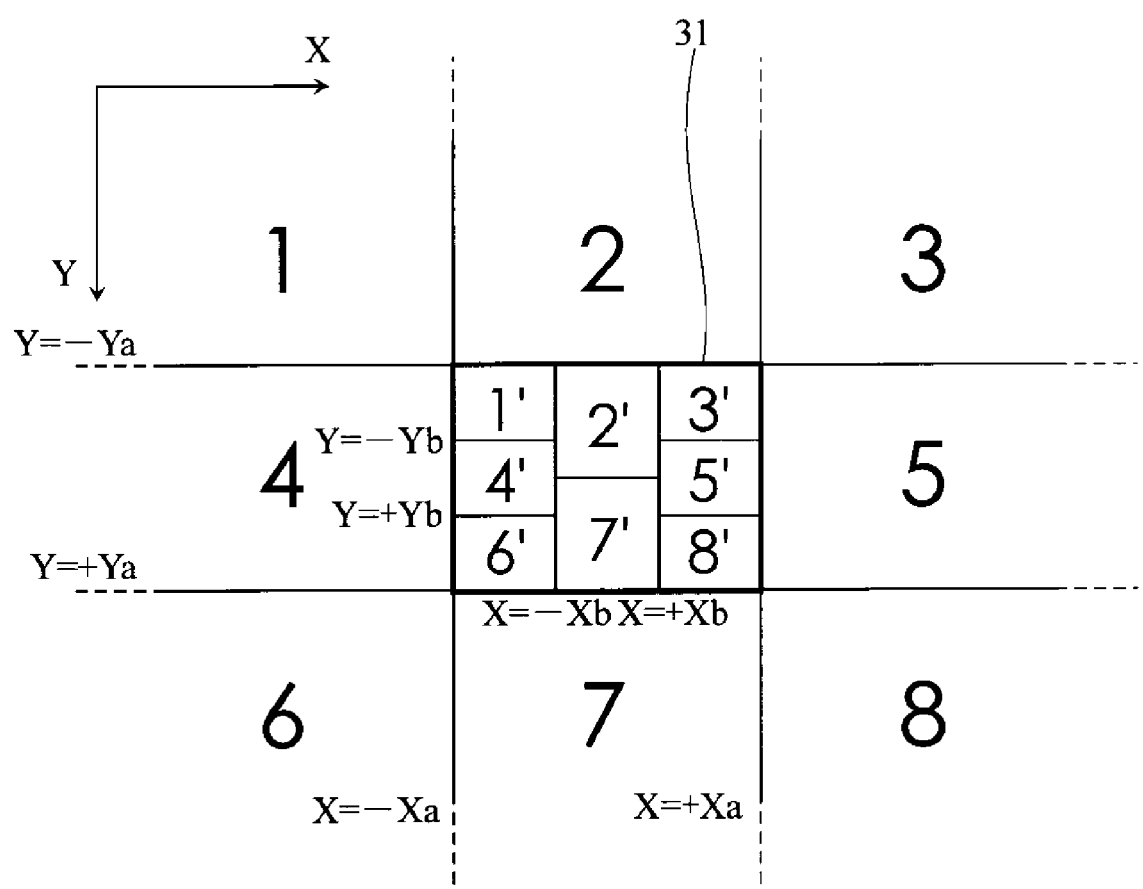
FIG. 2 shows a virtual plane which includes a display screen and is divided into a plurality of regions.

FIG. 2 illustrates a plurality of regions into which a virtual plane including the display screen 31 is divided based on coordinates in an orthogonal coordinate system defined in the plane. This coordinate system defines the center of the display screen 31 as (0, 0), the right-hand direction of the display screen 31 as the positive direction of X axis, and the downward direction of the display screen 31 as the positive direction of Y axis. Further, the right edge, the left edge, the lower edge, and the upper edge of the display screen 31 is represented as X=Xa, X=−Xa, Y=Ya, and Y=−Ya, respectively. In FIG. 2, a region within heavy lines, which is represented as −Xa≦X≦Xa and −Ya≦Y≦Ya, corresponds to the inside of the display screen 31. The intersecting point is calculated as coordinates (hereinafter referred to as "intersection coordinates") in this coordinate system.

When calculated intersection coordinates (X,Y) are within the range of −Xa≦X≦Xa and −Ya≦Y≦Ya, that is, when the intersection coordinates are inside the display screen 31, the cursor is displayed at a region whose central point is the intersection coordinates. In an actual operation, the cursor image is depicted on the display screen 31 with the central point being coordinates on the display screen 31 corresponding to the intersection coordinates. For example, if it is supposed that the display screen 31 is constituted of 640 pixels× 448 pixels, and the upper left corner of the screen represents the position (0, 0), intersection coordinates (0, 0) correspond to coordinates (320, 224) on the display screen 31, and therefore a cursor image is depicted in the region whose central point is the above-described coordinates.

As shown in FIG. 2, the region outside of the display screen 31, which is defined by X=−Xa, Xa, Y=−Ya, Ya, is divided into eight regions 1-8. FIG. 3 is a table which shows ranges of the respective regions. It should be noted here that the way the region is divided is not limited to this, and more and smaller regions may be made by division. If the calculated intersection coordinates is located in any one of these regions, the cursor is not displayed on the display screen 31. In this case, the cursor movement instruction icon which is determined based on which region the intersection coordinates are located at is blinked on the display screen 31 at the position determined based on that region (This blinking operation will be referred to as "the first display operation of the cursor movement instruction icon"). Such blinking is utilized for facilitating the user to be aware of the cursor movement instruction icon. Alternatively, the cursor movement instruction icon may be simply displayed if the size or the color thereof is so appealing that the user can easily be aware of it.

Figure 5:
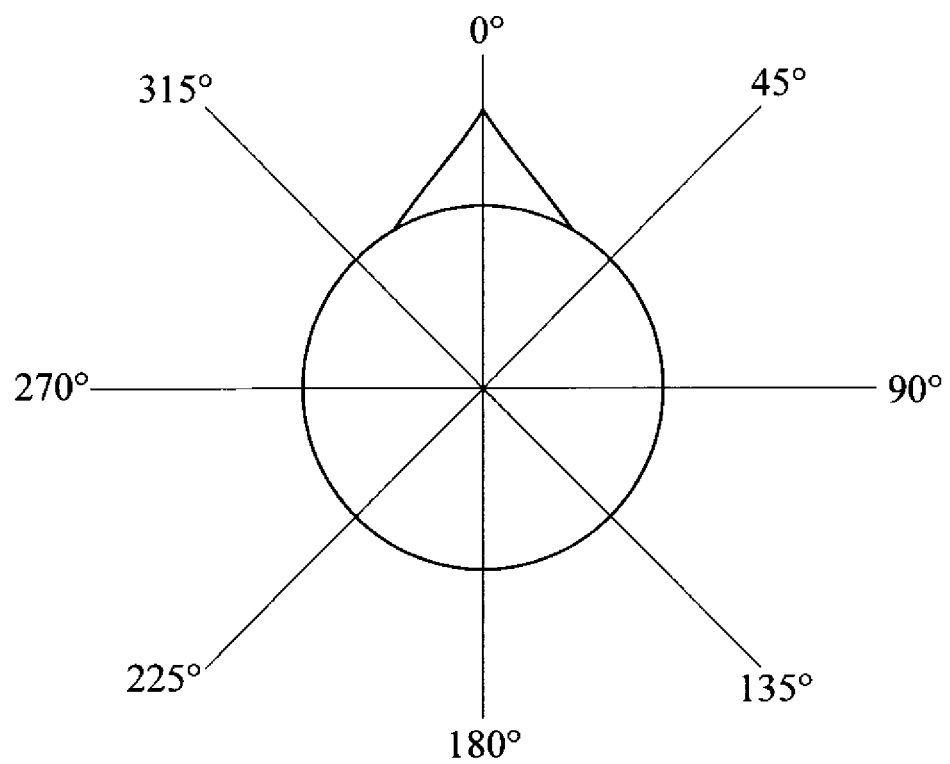
FIG. 5 is a diagram for describing cursor movement instruction icons matched with the icon directions in FIG. 4.

FIG. 4 is a table showing directions of the cursor movement instruction icon displayed on the display screen 31 determined based on the regions 1-8 which the intersection coordinates are located in, and also showing central coordinates (hereinafter, referred to as "icon coordinates") of the region which the cursor movement instruction icon is displayed in. Each of the icon coordinates is set near an edge of the display screen 31 within the respective one region. For example, icon coordinates (X1, Y1) is set to (30, 30) near the upper left corner of the display screen 31 having the above-mentioned pixel arrangement. FIG. 5 illustrates the cursor movement instruction icon correspond to an icon direction shown in FIG. 4. The cursor movement instruction icon is constituted of a circle centered on the icon coordinates and a substantially triangular projection projecting in the direction corresponding to the icon direction. The projection is provided so as to extend in the direction corresponding to one of the icon directions shown in FIG. 4, which are determined at every step of 45° in the clockwise direction from the upward direction 0° in FIG. 5. For example, the projection extends to the right side from the circle if the icon direction is 90°. Actually, the game data including image data of an icon image (pointing upward) shown in FIG. 5 and a table of icon direction and icon coordinates shown in FIG. 4 are loaded to a RAM from the DVD-ROM. Then, the image data of the icon image is rotated to an icon direction retrieved from the table for displaying. Alternatively, the table may contain a plurality of image data of icon images each of which corresponds to respective one icon direction, instead of a plurality of icon directions.

Figures 6, 7:
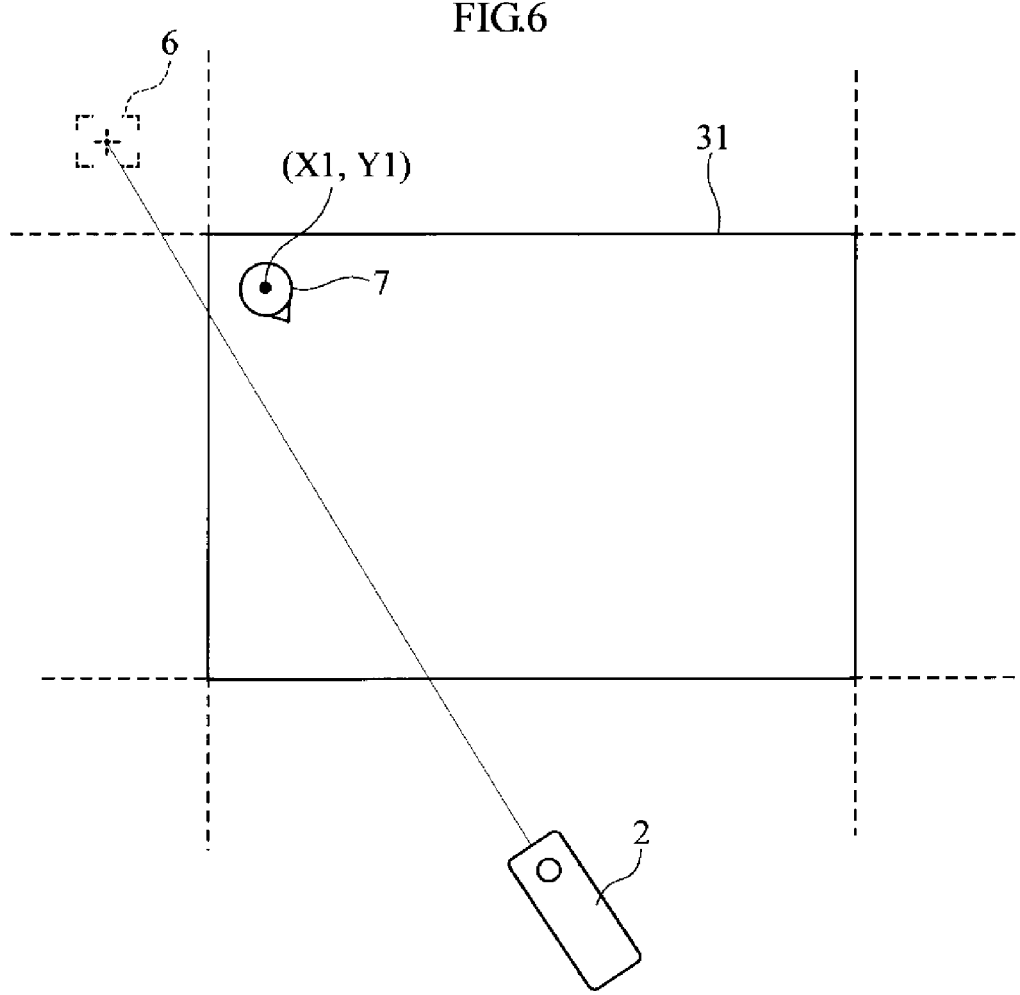
FIG. 6 shows an example of the cursor movement instruction icons displayed when calculated intersection coordinates fall in a region 1.
FIG. 7 is a table which shows ranges of regions 1' through 8'.

For example, FIG. 6 shows an example of the displayed cursor movement instruction icon in the case that the calculated intersection coordinates is located in the region 1. In this case, the cursor movement instruction icon 7 having a projection shown in FIG. 5 extending the direction of 135° is blinked in the display region centered on the coordinates (X1, Y1) on the display screen 31. This notifies the user that the cursor 6 has moved away in the upper left direction of the display screen 31, and the user is requested to bring the cursor 6 back in the direction indicated by the projection of the cursor movement instruction icon 7 into the display screen 31.

Next, an operation (referred to as "the second display operation of the cursor movement instruction icon") of displaying the cursor movement instruction icon in the case that the intersection coordinates is not able to be calculated will be described below.

When it is impossible to calculate the intersection coordinates, the icon direction (icon image) and the icon coordinates are determined based on the calculated preceding intersection coordinates. A state in which the intersection coordinates are not able to be calculated tends to occur by changing the direction pointed by the operational controller 2 to a direction away from the display screen 31 from the arrangement in which the intersection coordinates are located in one of the regions 1-8 (See FIG. 2.). Therefore, the cursor movement instruction icon corresponding to the icon coordinates set in FIGS. 4 and 5 is blinked based on which one of the regions the calculated preceding intersection coordinates were located in.

A state in which the intersection coordinates are not able to be calculated can also occur by changing the direction pointed by the operation controller 2 rapidly from the arrangement in which the intersection coordinates are located in the display screen 31. Since the operation controller 2 transmits the image capture information at every period of 1/30 second in the present embodiment, this state is established if the direction pointed by the operation controller 2 is changed in the period of 1/30 second from within the display screen 31 to a direction with which the intersection coordinates are not able to calculated. In this case, the calculated preceding intersection coordinates are in a region which corresponds to the inside of the display screen 31.

As shown in FIG. 2, the region which corresponds to the inside of the display screen 31 is divided by $X=-Xb, Xb, Y=-Yb, 0, Yb$ into eight regions 1'-8'. Xb and Yb are set as $Xb=(\frac{1}{3})Xa$ and $Yb=(\frac{1}{3})Ya$ so as to trisect the ranges $-Xa \leq X \leq Xa$ and $-Ya \leq Y \leq Ya$, respectively. It is rare that a state in which the intersection coordinates are located near the center of the display screen 31 is changed into a state in which the intersection coordinates are not able to be calculated. Since the display screen 31 has a horizontally long shape, it is more likely that the cursor moves out towards the upward or downward direction rather than towards the left or right direction. Therefore, the region is divided into the region 2' and the region 7' contacting each other at the center in the up and down direction in the present embodiment. FIG. 7 is a table which shows a range for each of the regions. It should be noted here that the way the region is divided is not limited to this. For example, division may be made more finely into smaller regions.

If the calculated preceding intersection coordinates are located in any of the regions 1'-8' corresponding to the inside of the display screen 31, the cursor movement instruction icon corresponding to the icon coordinates set in FIGS. 4 and 5 is blinked based on the region.

The intersection coordinates are not able to be calculated also in the case that an obstacle between the operation controller 2 and the light emitting device 4 inhibits the operation controller from capturing the light emitted by the light emitting device. In this case, the cursor movement instruction icon is displayed based on the calculated preceding intersection coordinates although there is no need to change the direction pointed by the operation controller 2. However, this is not severely problematic because the user is aware that the obstacle in front of him/her causes the display, and then moves the obstacles away ignoring the displayed cursor movement instruction icon.

Further, in the present embodiment, when the state in which the intersection coordinates are not able to be calculated continues for a predetermined period, since the cursor position is unclear (that is, it is not likely that the operation controller 2 actually points to the position based on the calculated preceding intersection coordinates), a warning is displayed and audio guidance is made for requesting the user to change the direction of the operation controller 2 toward the display screen 31. In this way, the user is informed that the cursor position is unclear, and the user is requested to move the cursor back to within the screen without notifying information about an unlikely situation (that is, the position based on the calculated preceding intersection coordinates). The warning may be made by displaying an icon. However, for the purpose of notifying the user who has not become aware of the cursor movement instruction icon, it is better to use notifying means other than an icon. The warning will also help the user become aware of an issue in other situations such as when the user is not aware of an object between the operation controller 2 and the light emitting device 4, when the operation controller 2 is too close to the display screen 31, and when the tip of the operation controller 2 is too dirty to capture the beams from the light emitting device 4.

Next, hard ware configuration of the game machine 1 and the operation controller 2 will be described below.

Figure 8:
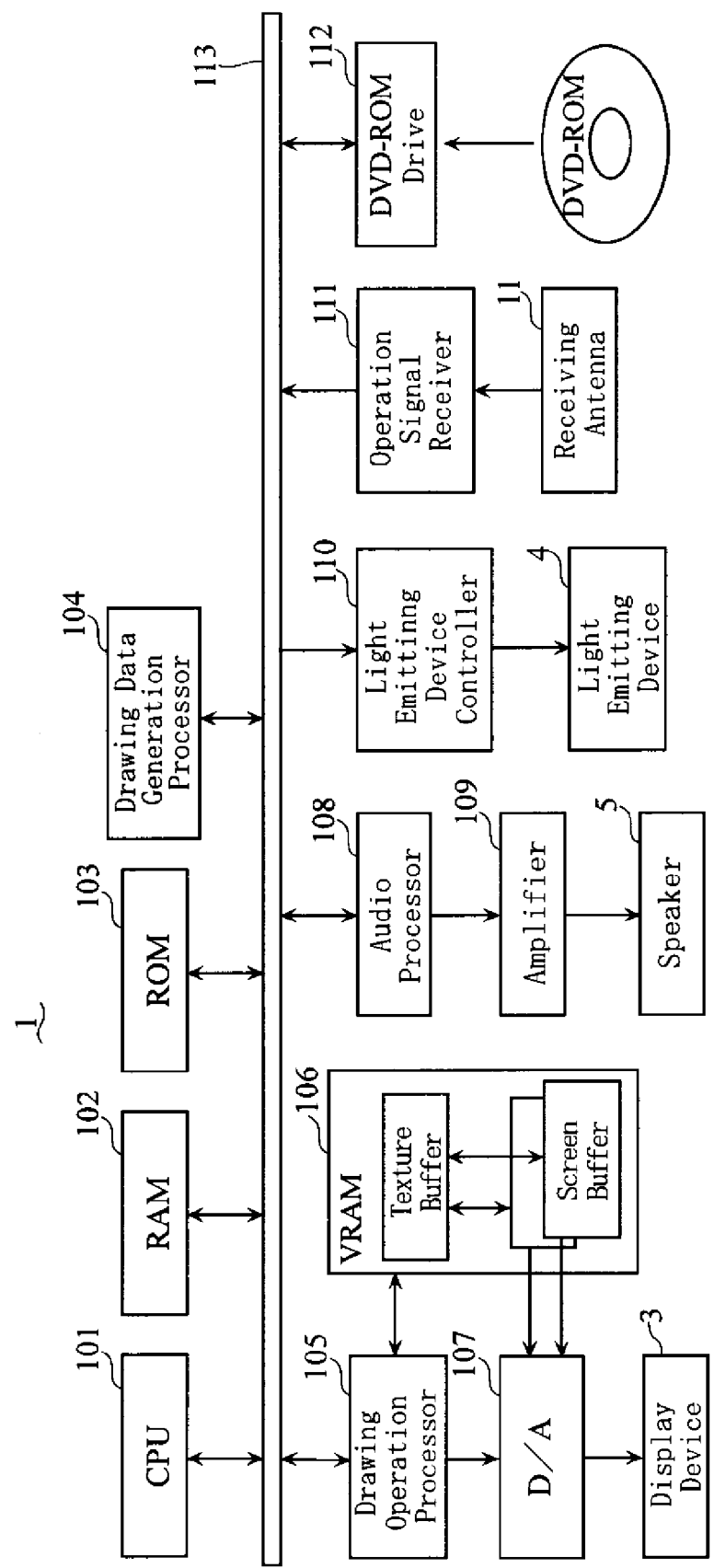
FIG. 8 is a block diagram showing an internal configuration of the game machine 1.

FIG. 8 is a block diagram showing the internal configuration of the game machine 1. The game machine 1 includes a CPU 101, a RAM (Random Access Memory) 102, a ROM (Read Only Memory) 103, a drawing data generation processor 104, a drawing operation processor 105, a VRAM (Video-RAM) 106, a D/A (Digital-Analog) converter 107, an audio processor 108, an amplifier 109, a light emitting device controller 110, an operation signal receiver 111, a DVD-ROM drive 112 and a bus 113.

The game machine 1 is connected with a television set. The display device of the television set, such as a cathode ray tube or a liquid crystal display, is used as the external display device 3 connected to the D/A converter 107 whereas a speaker incorporated in the television set is used as an external speaker 5 connected to the amplifier 109.

The game machine 1 is also connected with the light emitting device 4 via the light emitting device controller 110, and is provided with the receiving antenna 11 connected to the operation signal receiver 111. The light emitting device 4 is controlled so as to emit light with the light emitting lamps 41, 42. The information to calculate the above-described intersection position is obtained from the position of the light emitted by the light emitting device 4 in the image captured by the image capturing sensor 21 of the operation controller. Further, the light emitting device 4 utilizes infrared light having a wavelength out of the visible region not to disturb operation by the user.

The CPU 101, the RAM 102, the ROM 103, the drawing data generation processor 104, the drawing operation processor 105, the audio processor 108, the light emitting device controller 110, the operation signal receiver 111 and the DVD-ROM drive 112 are connected with each other via the bus 113 for mutual data transmission.

The CPU 101 controls the whole progress of the game by executing the game program loaded to the RAM 102 from the DVD-ROM, as described earlier. Specifically, when the operation controller 2 transmits a signal, the CPU 101 processes a prescribed game operation in accordance with the signal under the game program. Further, the CPU 101 displays the process result in the form of a three-dimensional image on the display device 3, and outputs the result as sound effects with the speaker 5.

Processes of displaying the three-dimensional image on the display device 3 is performed mainly by the drawing operation processor 105. The CPU 101 determines the content of three-dimensional image to be displayed on the display device 3 based on the signal from the operation controller 2. The drawing data generation processor 104 generates necessary imaging data for the content. The drawing operation processor 105 performs the processes of drawing in accordance with the transmitted imaging data. Further, the CPU 101 determines contents of sound effects or BGM to be output from the speaker 5. The audio processor 108 produces audio data corresponding to the audio contents, and drives the speaker 5 to output the audio data via the amplifier 109.

Further, the CPU 101 performs control for displaying of the cursor and the cursor movement instruction icon described above. In other words, the CPU 101 calculates the intersection coordinates from the image capture information received from the operation controller 2. Next, the CPU 101 determines which one of the regions the intersection coordinates is located in, and displays the cursor or the cursor movement instruction icon at a determined position. Further, the CPU 101 measures the term during which the intersection coordinates are not able to calculated, and displays a warning and outputs sounds when a prescribed term lapses.

The RAM 102 provides a storage area for game programs and game data loaded from a DVD-ROM in the DVD-ROM drive 112 and a work area for the CPU 101 to execute the game programs. The game program and the game data necessary to perform the game are read out from the DVD-ROM and then stored in the RAM 102. The game data include tables (See FIGS. 3 and 7) for determining which one of the regions the intersection coordinates are located in, icon images (See FIG. 5), tables (See FIG. 4) of icon coordinates and so on, as described above. Further, the work area provides a region for storage and updating the intersection coordinates.

The ROM 103 stores a basic program which includes basic functions of the game machine 1, such as disc loading function, and procedures to reading the game program and the game data recorded in the DVD-ROM, and so on. The CPU 101 operates the DVD-ROM drive 112 in accordance with the basic program stored in the ROM 103 when a DVD-ROM is dropped on the DVD-ROM drive 112. The CPU 101 loads game programs and game data from the DVD-ROM to the RAM 102, and makes settings to start the game.

The drawing data generation processor 104 performs various operations necessary for the drawing process. Based on image data from the RAM 102 and operation information from the operation controlling device 2, the drawing data generation processor 104 calculates data necessary for drawing, and supplies the calculation results to the drawing operation processor 105.

The drawing operation processor 105 generates images for each of the frames in three-dimensional image (two-dimensional images produced by perspective projection) and displays it on the display device 3. The drawing operation processor 105 produces a two-dimensional image of each frame to display on the display device 3 using data supplied from the drawing data generation processor 104 based on a drawing instruction from the CPU 101. In this process, an image of a cursor or of a cursor movement instruction icon is pasted on a predetermined position in the two-dimensional image according to need. The drawing operation processor 105 is connected with the VRAM 106 for forming two-dimensional images for each frame. The drawing operation processor 105 produces data of a two-dimensional image of a frame at every $\frac{1}{30}$ second period using the VRAM 106.

The D/A converter 107 converts image data output from the VRAM 106 into analog signals for outputting the signals to the display device 3.

The audio processor 108 reads audio data of sound effect or BGM out from the RAM 102, and performs a predetermined process and D/A conversion for outputting to the amplifier 109. The amplifier 109 amplifies the audio signals from the audio processor 108 at a predetermined gain and then outputs the signals to the speaker 5.

The light emitting device controller 110 controls the light emitting device 4 so as to emit light based on an instruction from the CPU 101.

The operation signal receiver 111 receives signals sent from the operation controller 2 by short range wireless communication with the receiving antenna 11. The signals from the operation controller 2 include operation information regarding the operation button provided on the operation controller 2, and measurement data from e.g. an acceleration sensor provided in the operation controller 2, image capture information, and so on. The user can play the game by these signals sent from the operation controller 2.

Figure 9:
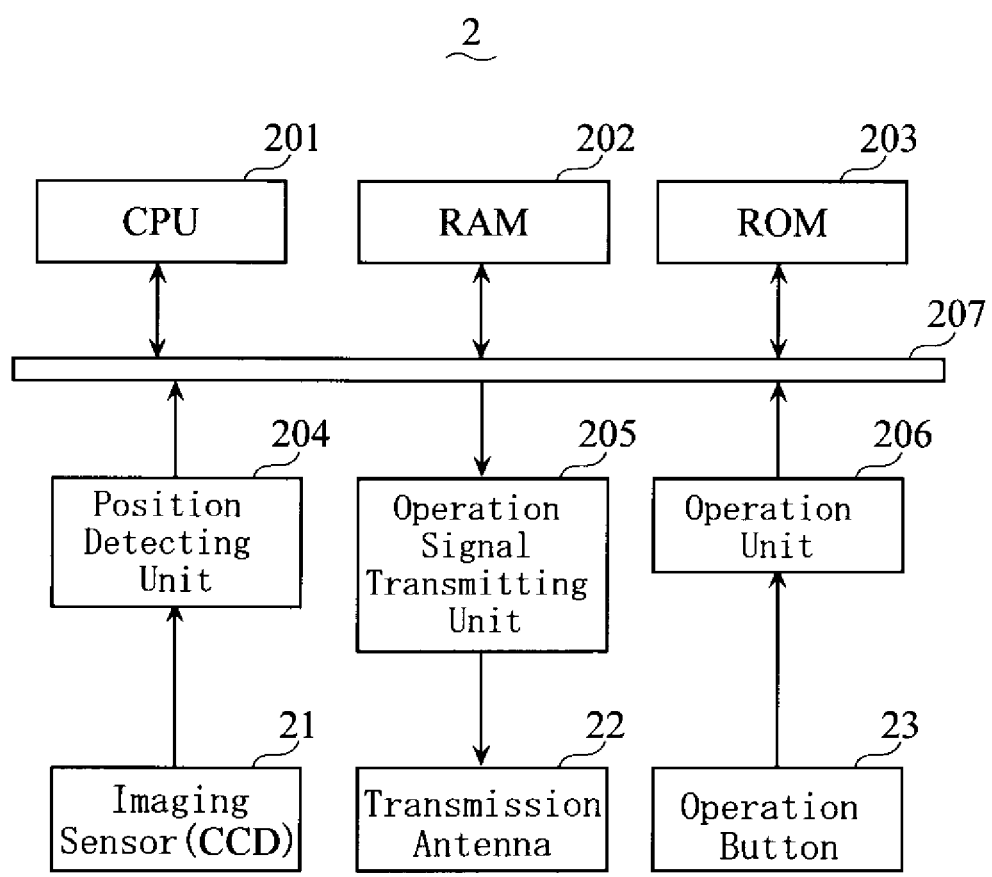
FIG. 9 is a block diagram showing an internal configuration of an operation controller 2.

FIG. 9 is a block diagram showing the internal configuration of the operation controller 2. The operation controller 2 includes a CPU 201, a RAM 202, a ROM 203, a position detecting unit 204, an operation signal transmitting unit 205, and an operation unit 206.

The operation controlling device 2 is provided with an imaging sensor 21, such as a CCD camera, connected to the position detecting unit 204, a transmission antenna 22 connected to the operation signal transmitting unit 205 and an operation button 23 connected to the operation unit 206.

The CPU 201, the RAM 202, the ROM 203, the position detecting unit 204, the operation signal transmitting unit 205 and the operation unit 206 are connected with each other via the bus 207 for mutual data transmission.

The CPU 201 controls the operation controller 2 based on control programs stored in the ROM 203. The RAM 202 provides a work area for operation of the CPU 201. The ROM 203 stores the control programs for controlling the operation controller 2.

The position detecting unit 204 detects the positions of light emitted from the light emitting device in the image captured by the imaging sensor 21. The CPU 201 controls the operation signal transmitting unit 205 to transmit image capture information, which is information about the position of light if the position detecting unit 204 could detect the position of light, or information that the position of light could not be detected if the position detecting unit 204 could not detect the position of light.

The operation signal transmitting unit 205 transmits an operation signal from the operation unit 206, image capture information from the position detecting unit 204, and measurement data from e.g. an acceleration sensor, which is not illustrated, via the transmission antenna 22 by short range wireless communication.

The operation unit 206 detects that the operation button 23 is pressed in the form of an operation signal. The operation button 23 is pressed to select an icon or an item on which the cursor is superimposed on the display screen 31, or to specify a position on the display screen 31. The operation unit 206 detects this pressing of the operation button 23 in the form of an operation signal. The operation signal transmitting unit 205 transmits the operation signal to the game machine 1. The game machine 1 performs a prescribed process (such as a process for the selected icon or item, or movement of a character to the specified position) based on the received operation signal and the position of the cursor on the display screen 31.

Next, the procedures of displaying the cursor will be described below with reference to the flowcharts in FIGS. 10-12.

Figure 10:
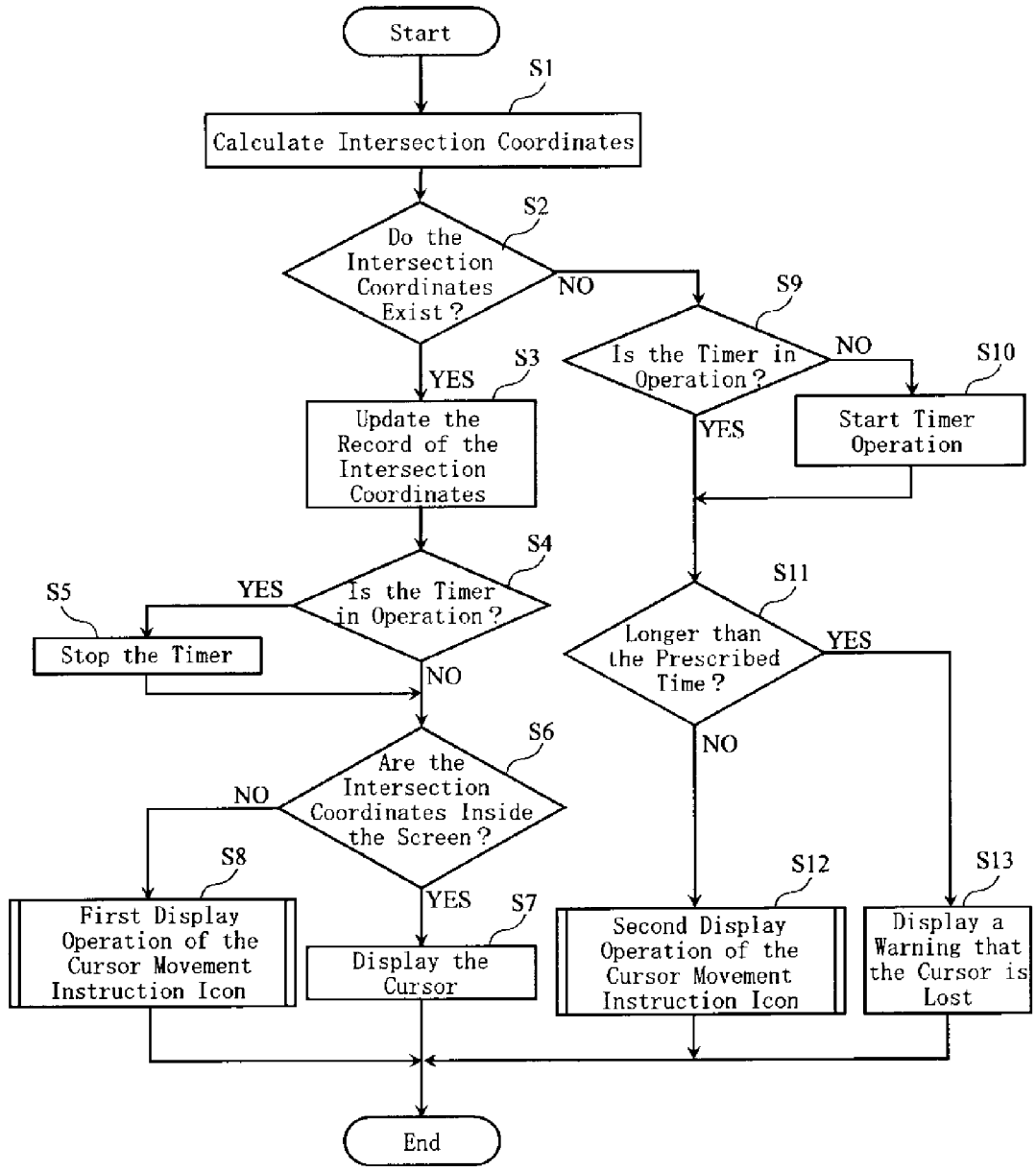
FIG. 10 is a main flowchart of a cursor display operation.

FIG. 10 is a main flowchart of a cursor display operation. This operation is performed by the CPU 101 each time image capture information is sent from the operation controller 2.

After the image capture information is transmitted from the operation controller 2, the intersection coordinates are calculated (S1). Next, it is determined whether the intersection coordinates have been successfully calculated (S2). If the intersection coordinates have been calculated successfully (S2: YES), the intersection coordinates stored in the RAM 102 are updated with the calculated intersection coordinates (S3) for referencing next time if the intersection coordinates are not able to be calculated. Next, it is determined whether the timer for measuring the time period of the state in which the intersection coordinates are not able to be calculated is in operation (S4). If the timer is in operation (S4:YES), the timer is stopped (S5) for stopping time measurement because the intersection coordinates have been calculated successfully.

Next, it is determined whether the intersection coordinates are located within the screen display 31 (S6). That is, it is determined whether the intersection coordinates (X, Y) are within the range of $-Xa \leq X \leq Xa$ and $-Ya \leq Y \leq Ya$. If the intersection coordinates are inside the display screen 31 (S6: YES), a cursor is displayed at the intersection coordinates (S7). If the intersection coordinates are not inside the display screen 31 (S6: NO), the first display operation of the cursor movement instruction icon is performed (S8). The first display operation of cursor movement instruction icon will be described later.

If the intersection coordinates have not been calculated in step S2, it is determined whether the timer for measuring the time period of the state in which the intersection coordinates are not able to be calculated is in operation (S9). If the timer is not in operation (S9:NO), operation of the timer is started (S10).

Next, it is determined whether the time period during which the timer continues to measure time is longer than a predetermined time (S11). If the time period is not longer than the predetermined time yet (S11: NO), the second display operation of the cursor movement instruction icon is performed (S12). The second display operation of cursor movement instruction icon will be described later. If the time period is longer than the predetermined time (S11: YES), it is notified that the cursor position is unclear (S13).

Figure 11:
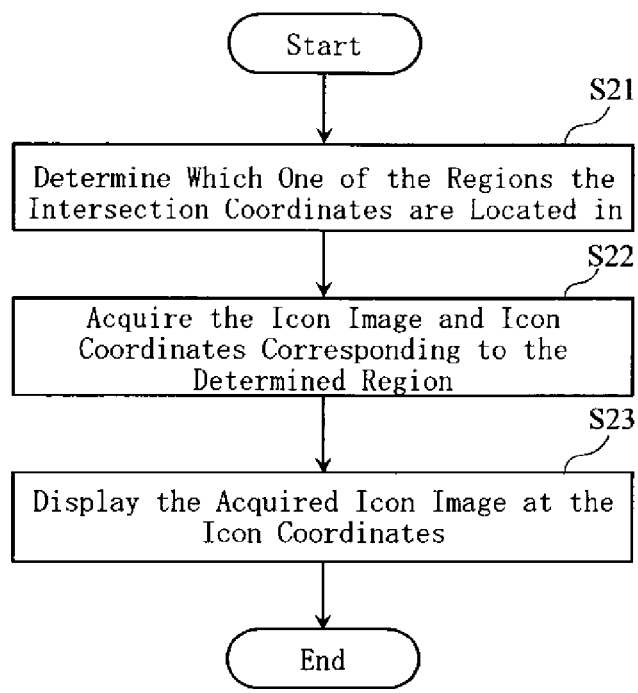
FIG. 11 is a flowchart showing a first display operation of cursor movement instruction icon.

FIG. 11 is a flowchart showing the first display operation of cursor movement instruction icon.

First, it is determined which one of the regions 1-8 the intersection coordinates are located in with reference to the table (See FIG. 3.) stored in the RAM 102 (S21). Next, an icon image and icon coordinates are obtained based on the table (See FIG. 4.) and the icon image (See FIG. 5.) stored in the RAM 102 (S23). Next, the icon image is displayed at the obtained icon coordinates on the display screen 31 (S23).

Figure 12:
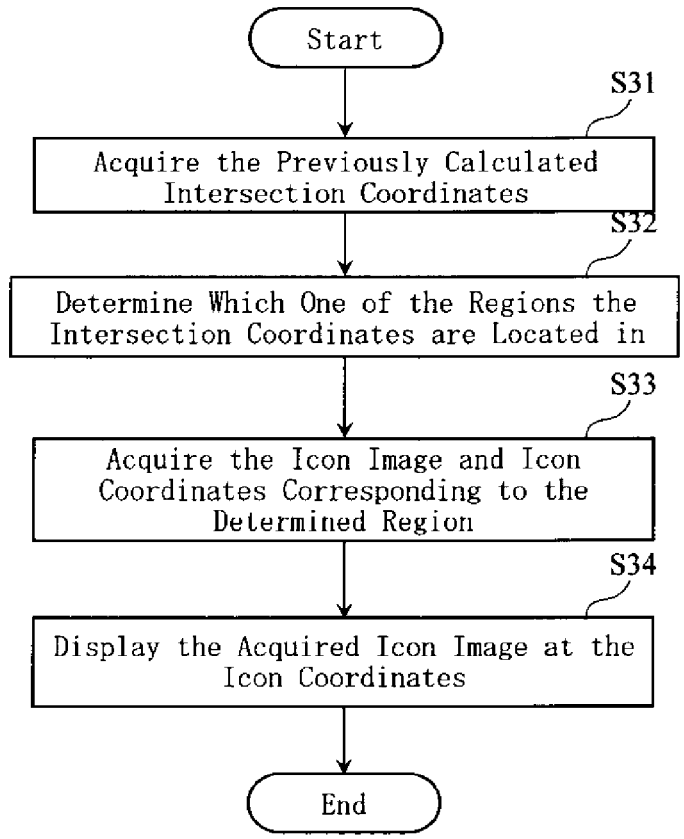
FIG. 12 is a flowchart showing a second display operation of cursor movement instruction icon

FIG. 12 is a flowchart showing the second display operation of cursor movement instruction icon.

First, the calculated preceding intersection coordinates are obtained from the RAM 102 (S31). It is determined which one of the regions 1-8 and 1'-8' the intersection coordinates are located in with reference to the tables (See FIGS. 3 and 7.) stored in the RAM 102 (S32). Next, an icon image and icon coordinates corresponding to the determined region are obtained based on the table (See FIG. 4.) and the icon image (See FIG. 5.) stored in the RAM 102 (S33). Next, the icon image is displayed at the obtained icon coordinates on the display screen 31 (S34).

If the intersection coordinates are not calculated or the calculated intersection coordinates are located outside of the display screen 31, the cursor movement instruction icon is displayed on the display screen 31, as described above. Therefore, the user can be aware that the cursor has moved out of the display screen 31, and move the cursor back to inside of the display screen 31 as instructed by the cursor movement instruction icon. Further, if the intersection coordinates are not calculated for a period longer than the predetermined time, the user is warned to move the cursor back to inside. Therefore, even if the user is not aware of the cursor movement instruction icon, such a warning can facilitate the user to move the cursor back the inside of the display screen 31.

In this way, it is determined which direction the cursor has moved out based on the region in which the intersection coordinates are located in, and the icon image is displayed on the position set in accordance with the region in the first embodiment. However, the cursor movement instruction icon may be displayed on a position calculated directly from the intersection coordinates, and the icon image may be produced based on the calculated position.

Figure 13:
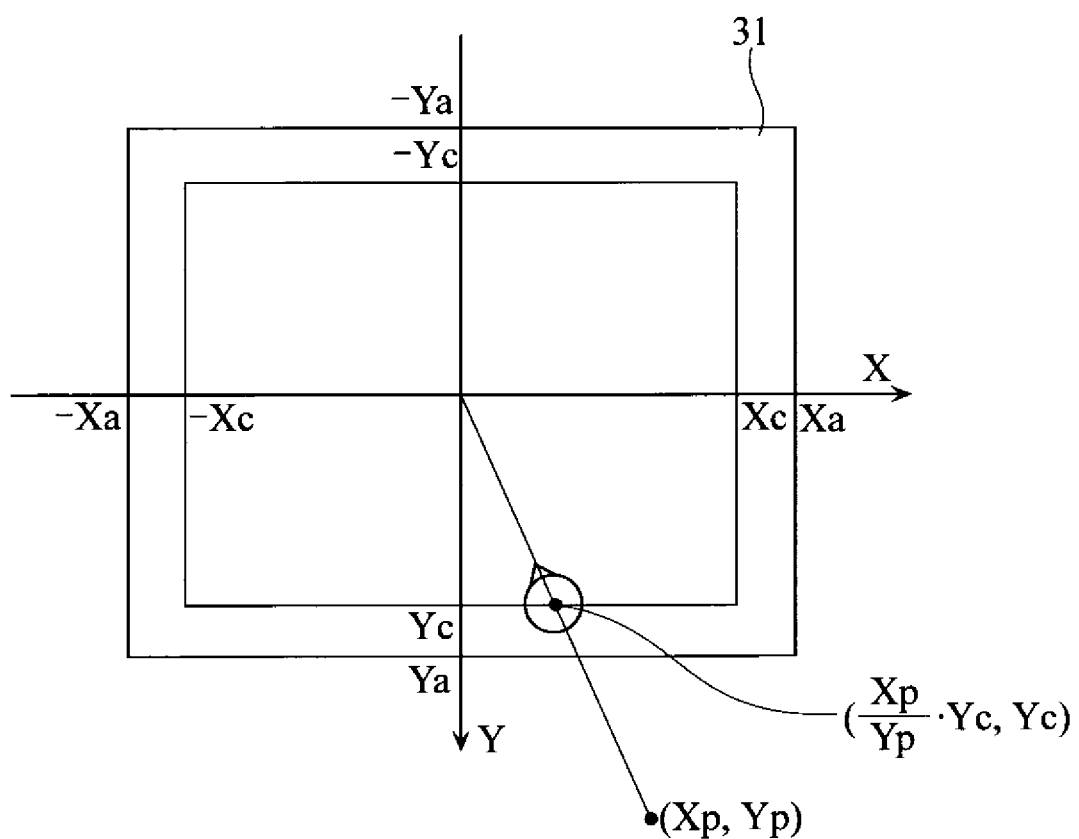
FIG. 13 is a diagram for describing a second embodiment.
Figure 14:
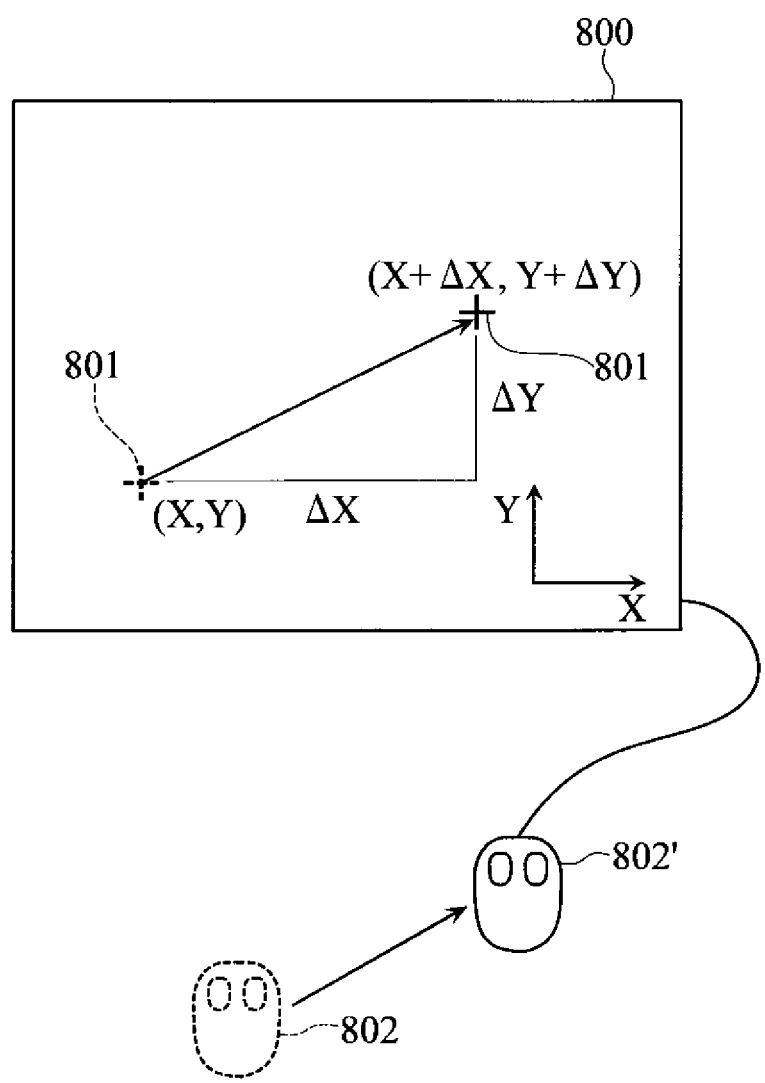
FIG. 14 is a diagram for describing how a cursor may be moved by using a mouse.
Figure 15:
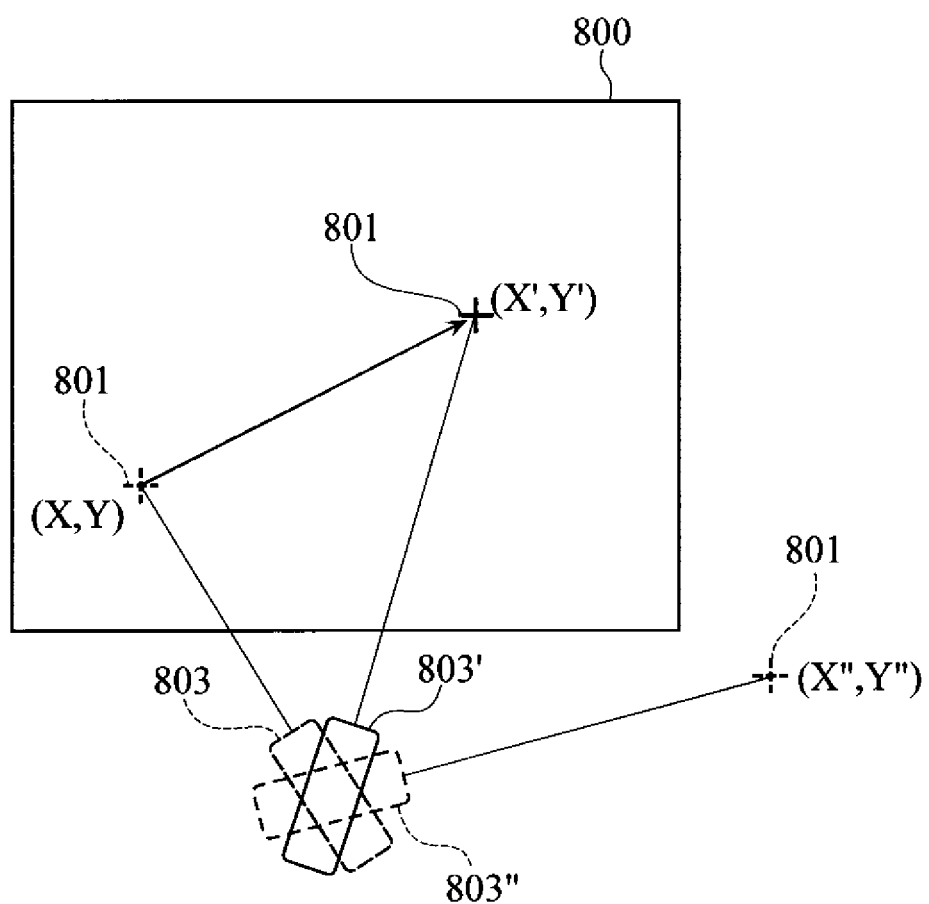
FIG. 15 is a diagram for describing how a cursor may be moved by using a pointing device.

FIG. 13 is a diagram for describing a second embodiment, in which a position at which the cursor movement instruction icon is displayed is calculated and an icon image is produced based on the intersection coordinates located outside the display screen. The second embodiment differs from the first embodiment in that the method to obtain the position at which the cursor movement instruction icon is to be displayed and the icon image. Only this method will be described below. FIG. 13 shows an orthogonal coordinate system defined in a virtual plane including the display screen 31 similar to that of the first embodiment. Further, lines X=Xc, X=−Xc, Y=Yc and Y=−Yc are provided in the region corresponds to the display screen 31. The intersection of these lines and the line extending from the origin of the coordinate system to the intersection coordinates (Xp,Yp) provides the central point of the region which the cursor movement instruction icon is displayed in. Xc and Yc are so set that the entirety of the cursor movement instruction icon in displayed inside the display screen 31, and the cursor movement instruction icon is located not to cause an obstruction to the game operation. The icon image is constituted of a circle, centered on the intersection and having a predetermined radius, and a projection projecting from the circle toward the origin.

For example, if the intersection coordinates (Xp, Yp) are located in the first quadrant, the intersection of the line Y=(Yp/Xp)X and the line Y=Yc(0≦X≦Xc) or X=Xc (0≦Y≦Yc) is calculated. As shown in FIG. 13, if the intersection is located on the line Y=Yc(0≦X≦Xc), the intersection is ((Xp/Yp)Yc, Yc). A circle centering on this intersection and a projection projecting toward the origin are displayed in a proper region on the display screen 31.

In this embodiment, if the cursor is not displayed in the display screen 31, it is notified in which direction the cursor is moved out of the display screen 31 by means of the icon image and the position which the icon image is displayed at. However, the direction may be notified to the user only by changing the icon image with the cursor movement instruction icon being displayed at a predetermined position such as the center of the screen. Further, the direction may be notified only by changing the position where the icon image is displayed with the icon image being kept unchanged. Further, means for notifying the direction in which the cursor has moved out is not limited to displaying the icon. The direction may be notified by displaying at text, sound, or combination of them. Further, it may be notified only that the cursor has moved out of the display screen 31, instead of which direction the cursor has moved in.

In describing the above embodiments, the display controlling device according to the present invention is, applied in a home game machine. However, the display controlling device according to the present invention is applicable to not only a home game machine, but also other types of game machines such as an arcade game machine. Further, the display controlling device according to the present invention is applicable to a portable game machine if the imaging sensor is mounted on a member fixed to the user's body, and the member is configured to function as a pointing device when the member is moved relatively to the display screen provided with a light emitting device. Further, the display controlling device according to the present invention is applicable to machines other than a game machine for pointing the position on the display screen 31 with a cursor being displayed on the display screen.

In the embodiment above, information about the position of light emitted from the light emitting device 4 in the image captured by the imaging sensor 21 is transmitted to the game machine 1 as the image capture information. However, the intersection coordinates may be calculated from the image capture information in the operation controller 2, and information about the calculated intersection coordinates or information that the intersection coordinates have not been calculated may be transmitted to the game machine 1. In this case, "signal based on the image capture information of the imaging sensor" of the present invention is information about the calculated intersection coordinates or information that the intersection coordinates have not been-calculated.

Further, the intersection coordinates may be obtained by means other than calculation from the image capture information from the imaging sensor 21 of the operation controller. For example, a plurality of cameras provided near the display screen 31 may capture the image of the operation controller 2, and the direction pointed by the operation controller 2 may be calculated from the three dimensional positions of the top and bottom tips of the operational controller 2, and the intersection coordinates may be obtained from the direction. Further, the orientation of the operation controller 2 relative to the orientation of the operation controller 2 pointing the center of the display screen 31 may be determined from a acceleration sensor mounted therein, and the direction pointed by the operation controller 2 may be calculated from the change of the orientation, and the intersection coordinates may be obtained from the direction. In this case, the change of orientation is not detected if the operation controller 2 moves parallel with its orientation being kept unchanged. Therefore, lateral cursor movement has to be achieved by e.g. lateral rotation of the operation controller 2.

In the embodiment above, the cursor is displayed at the position of the intersection of the optical axis of the imaging sensor 21 and the plane including display screen 31 of the display device 3. However, the display controlling device according to the present invention is not limited to this configuration. The cursor may be displayed at the position of the intersection of an axis extending from one surface of the operation controller 2 in a prescribed direction and the plane including the display screen 31. Here, the surface of the operation controller 2 means the side surface provided with the imaging sensor 21, and the axis extending in a prescribed direction means an axis extending substantially in parallel with the optical axis of the imaging sensor 21.

The invention claimed is:
1. A display controlling device comprising:
a display unit for displaying an image;
an input unit at which a signal is input, the signal being output from an operation unit, the operation unit including an imaging sensor for capturing a light image, the signal being based on an image captured by the imaging sensor, the operation unit being arranged for a user to hold and operate, the light image being emitted from a light emitter toward front of a display screen of the display unit, the light emitter being provided in a periphery of the display screen;
an intersection position acquirer for acquiring, at every predetermined period, information about a position of an intersection based on the signal input at the input unit, the intersection being produced by a plane including the display screen of the display unit and one of a region including an optical axis of the imaging sensor and a region including an axis substantially parallel to the optical axis;
a determiner for determining, at every predetermined period, whether the intersection is located inside the display screen of the display unit based on the information about the position of the intersection acquired by the intersection position acquirer;
a cursor displayer for displaying a cursor at the position of the intersection on the display screen of the display unit if the determiner determines that the intersection is located inside the display screen; and
a first notification controller for notifying that the cursor is located outside the display screen with a first notifier if the determiner determines that the intersection is not located inside the display screen.

2. The display controlling device according to claim 1, wherein the intersection position acquirer has an orthogonal coordinate system defined in a virtual plane including the display screen, and acquires coordinates of the intersection in the orthogonal coordinate system as information about the position of the intersection;

wherein the determiner determines whether the intersection is located inside the display screen of the display unit using the coordinates of the intersection acquired by the intersection position acquirer.

3. The display controlling device according to claim 2, wherein the intersection position acquirer can acquire the coordinates of the intersection in a prescribed region outside the display screen in the virtual plane;

wherein the determiner acquires the position of the intersection outside the display screen using the coordinates of the intersection acquired by the intersection position acquirer if the determiner determines that the intersection is located outside the display screen of the display unit;

wherein the first notification controller notifies the position of the intersection outside the display screen acquired by the determiner with the first notifier.

4. The display controlling device according to claim 2, further comprising a storage unit for storing information about the position of the intersection acquired by the intersection position acquirer every predetermined period;

wherein the determiner presumes the position of the intersection outside the display screen based on the coordinates of the preceding intersection acquired by the intersection position acquirer and stored in the storage unit if the determiner determines that the intersection is located outside the display screen of the display unit and if the intersection position acquirer has not been able to acquire the coordinates of the intersection, wherein the first notification controller notifies, through the first notifier, the position of the intersection located outside the display screen with the first notifier and presumed by the determiner.

5. The display controlling device according to claim 2, wherein the virtual plane outside the display screen is divided into a plurality of small regions, wherein the first notification controller includes:

a judgment unit for judging which one of the plurality the small regions the coordinates of the intersection acquired by the intersection position acquirer are located in; and an image displayer for memorizing information indicating the position of the intersection corresponding to each of the small regions, determining information corresponding to a judgment result of the judgment unit from the information, and displaying determined information on the display screen of the display unit.

6. The display controlling device according to claim 2, wherein the virtual plane outside the display screen is divided into two large regions outwardly of the screen, and the intersection position acquirer cannot acquire the coordinates of the intersection in one region outside, and the other region inside is divided into a plurality of regions, and the virtual plane inside the display screen is divided into a plurality of small regions, wherein the intersection position acquirer acquires the coordinates of the intersection as information about the position of the intersection if the intersection is located in the other region inside, and acquires that there are no coordinates of the intersection as information about the position of the intersection if the intersection is located in the one region outside, wherein the first notification controller including:

a storage unit for storing information about the position of the intersection acquired by the intersection position acquirer every predetermined period;

a judgment unit for judging which one of the plurality of the small regions in the other regions inside the intersection is located in based on the coordinates if the information about the position of the intersection acquired by the intersection position acquirer is the coordinates of intersection, and for judging which one of the plurality of small regions in the other region inside and the plurality of small regions inside the display screen the intersection is located in based on the coordinates of the preceding intersection acquired by the intersection position acquirer and stored in the storage unit if the information about the position of the intersection is that there are no coordinates of the intersection; and an image displayer for memorizing information indicating the position of the intersection corresponding to each of the small regions, determining the information corresponding to a judgment result of the judgment unit from the information, and displaying determined information on the display screen of the display unit.

7. The display controlling device according to claim 5, wherein the image displayer has a table in which icons corresponding to each of the small regions are set, and determines an icon corresponding to the judgment result of the judgment unit with reference to the table, and displays the icon at a prescribed position on the display screen of the display unit.

8. The display controlling device according to claim 7, wherein display positions on the display screen of the display unit corresponding to each of the small regions are set in the table, wherein the image displayer displays the icon at the display position corresponding to the judgment result of the judgment unit set in the table as the prescribed position.

9. The display controlling device according to claim 5, wherein the small regions includes at least eight regions each located in one of up, down, right, left, right oblique and left oblique directions.

10. The display controlling device according to claim 4, further comprising a time measurer for measuring time period during which the intersection position acquirer is not able to acquire the coordinates of the intersection; and a second notification controller for notifying that the position of the cursor is unclear with a second notifier if a time period measured by the time measurer become longer than a prescribed time period.

11. A non-transitory recording medium readable by a computer, the non-transitory recording medium storing a program configured to drive a computer provided with a display unit for displaying an image to function as:

an input unit at which a signal is input, the signal being output from an operation unit, the operation unit including an imaging sensor for capturing a light image, the signal being based on an image captured by the imaging sensor, the operation unit being arranged for a user to hold and operate, the light image being emitted from a light emitter toward front of a display screen of the display unit, the light emitter being provided in a periphery of the display screen;

an intersection position acquirer for acquiring, at every predetermined period, information about a position of an intersection based on the signal input at the input unit, the intersection being produced by a plane including the display screen of the display unit and one of a region including an optical axis of the imaging sensor and a region including an axis substantially parallel to the optical axis;

a determiner for determining, at every predetermined period, whether the intersection is located inside the display screen of the display unit based on the information about the position of the intersection acquired by the intersection position acquirer;

a cursor displayer for displaying a cursor at the position of the intersection on the display screen of the display unit if the determiner determines that the intersection is located inside the display screen; and a first notification controller for notifying that the cursor is located outside the display screen with a first notifier if the determiner determines that the intersection is not located inside the display screen.

12. The non-transitory recording medium readable by a computer according to claim 11, wherein the intersection position acquirer has an orthogonal coordinate system defined in a virtual plane including the display screen, and acquires coordinates of the intersection in the orthogonal coordinate system as information about the position of the intersection;
wherein the determiner determines whether the intersection is located inside the display screen of the display unit using the coordinates of the intersection acquired by the intersection position acquirer.

13. The non-transitory recording medium readable by a computer according to claim 12, wherein the intersection position acquirer can acquire the coordinates of the intersection in a prescribed region outside the display screen in the virtual plane;
wherein the determiner acquires the position of the intersection outside the display screen using the coordinates of the intersection acquired by the intersection position acquirer if the determiner determines that the intersection is located outside the display screen of the display unit;
wherein the first notification controller notifies the position of the intersection outside the display screen acquired by the determiner with the first notifier.

14. The non-transitory recording medium readable by a computer according to claim 12, further comprising a storage unit for storing information about the position of the intersection acquired by the intersection position acquirer every predetermined period;
wherein the determiner presumes the position of the intersection outside the display screen based on the coordinates of the preceding intersection acquired by the intersection position acquirer and stored in the storage unit if the determiner determines that the intersection is located outside the display screen of the display unit and if the intersection position acquirer has not been able to acquire the coordinates of the intersection,
wherein the first notification controller notifies, through the first notifier, the position of the intersection located outside the display screen with the first notifier and presumed by the determiner.

15. The non-transitory recording medium readable by a computer according to claim 12, wherein the virtual plane outside the display screen is divided into a plurality of small regions,
wherein the first notification controller includes:
a judgment unit for judging which one of the plurality the small regions the coordinates of the intersection acquired by the intersection position acquirer are located in; and
an image displayer for memorizing information indicating the position of the intersection corresponding to each of the small regions, determining information corresponding to a judgment result of the judgment unit from the information, and displaying determined information on the display screen of the display unit.

16. A display controlling method comprising the steps of:
preparing a display unit for displaying an image;
capturing a light image by an imaging sensor of an operation unit, the operation unit being arranged for a user to hold and operate, the light image being emitted from a light emitter toward front of a display screen of the display unit, the light emitter being provided in a periphery of the display screen;
inputting a signal at an input unit, the signal being output from the operation unit, the signal being based on the light image captured by the imaging sensor;
acquiring, at every predetermined period by an intersection position acquirer, information about a position of an intersection based on the signal input at the input unit, the intersection being produced by a plane including the display screen of the display unit and one of a region including an optical axis of the imaging sensor and a region including an axis substantially parallel to the optical axis;
determining, at every predetermined period by a determiner, whether the intersection is located inside the display screen of the display unit based on the information about the position of the intersection acquired by the intersection position acquirer;
displaying a cursor by a cursor displayer at the position of the intersection on the display screen of the display unit if the determiner determines that the intersection is located inside the display screen; and
notifying that the cursor is located outside the display screen with a first notifier by first notification controller if the determiner determines that the intersection is not located inside the display screen.

17. The display controlling method according to claim 16, wherein the intersection position acquirer has an orthogonal coordinate system defined in a virtual plane including the display screen, and acquires coordinates of the intersection in the orthogonal coordinate system as information about the position of the intersection;
wherein the determiner determines whether the intersection is located inside the display screen of the display unit using the coordinates of the intersection acquired by the intersection position acquirer.

18. The display controlling method according to claim 17, wherein the intersection position acquirer can acquire the coordinates of the intersection in a prescribed region outside the display screen in the virtual plane;
wherein the determiner acquires the position of the intersection outside the display screen using the coordinates of the intersection acquired by the intersection position acquirer if the determiner determines that the intersection is located outside the display screen of the display unit;
wherein the first notification controller notifies the position of the intersection outside the display screen acquired by the determiner with the first notifier.

19. The display controlling method according to claim 17, further comprising the step of storing, by a storage unit, information about the position of the intersection acquired by the intersection position acquirer every predetermined period;
- wherein the determiner presumes the position of the intersection outside the display screen based on the coordinates of the preceding intersection acquired by the intersection position acquirer and stored in the storage unit if the determiner determines that the intersection is located outside the display screen of the display unit and if the intersection position acquirer has not been able to acquire the coordinates of the intersection,
- wherein the first notification controller notifies, through the first notifier, the position of the intersection located outside the display screen with the first notifier and presumed by the determiner.

20. The display controlling method according to claim 17, wherein the virtual plane outside the display screen is divided into a plurality of small regions,
- wherein the first notification controller includes:
- a judgment unit for judging which one of the plurality the small regions the coordinates of the intersection acquired by the intersection position acquirer are located in; and
- an image displayer for memorizing information indicating the position of the intersection corresponding to each of the small regions, determining information corresponding to a judgment result of the judgment unit from the information, and displaying determined information on the display screen of the display unit.

* * * * *